Figure 1:
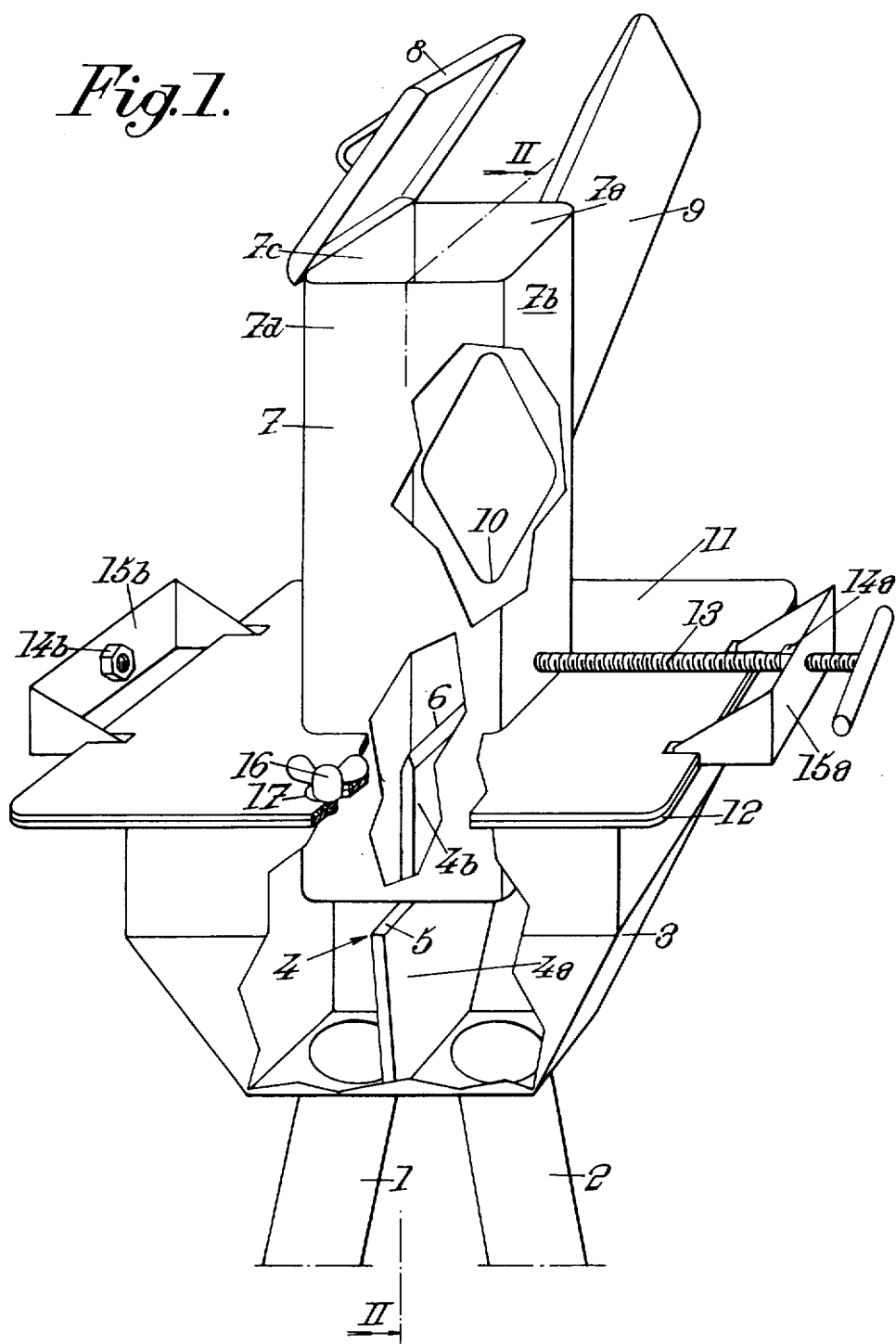

United States Patent [19]

Carré et al.

[11] 4,039,062

[45] Aug. 2, 1977

[54] FLOW DIVIDER FOR A POWDERY MATERIAL

[75] Inventors: Christian Carré, Houilles; Albert Rebours, Chatou, both of France

[73] Assignee: Air-Industrie, Courbevoie, France

[21] Appl. No.: 632,983

[22] Filed: Nov. 18, 1975

[30] Foreign Application Priority Data

Nov. 28, 1974 France .................... 74.39012

[51] Int. Cl.² ........................... B65G 11/20
[52] U.S. Cl. ..................... 193/31 R; 222/485; 222/547; 222/564; 137/610
[58] Field of Search ........... 222/478, 485, 489, 460, 222/462, 547, 564; 193/31 R, 31 A, 29; 243/31; 137/610, 625.48; 302/27-28

[56] References Cited

U.S. PATENT DOCUMENTS

| 82,653 | 9/1868 | Spear | 137/610 |
| 88,618 | 4/1869 | Field | 137/610 |
| 304,259 | 8/1884 | Brunton | 193/31 A X |
| 765,657 | 7/1904 | Arnault | 302/28 X |
| 1,116,270 | 11/1914 | Harper | 193/31 R |
| 1,354,747 | 10/1920 | Hiller | 193/31 A X |
| 1,621,022 | 3/1927 | Merchen | 193/31 R X |
| 3,848,635 | 11/1974 | Scheffler, Jr. | 137/610 |

*Primary Examiner*—Robert B. Reeves
*Assistant Examiner*—Charles A. Marmor
*Attorney, Agent, or Firm*—Lane, Aitken, Dunner & Ziems

[57] ABSTRACT

Flow divider for a powdery material, comprising a vertical duct supplied with said material. A knife with a separating upper edge is provided at the outlet of said duct to divide the inflow of said material into two outflows. At least one straight air passage is provided, lateral with respect to the vertical axis of the knife, between the inlets of two eduction chutes for said outflows. The level of said air passage is notably below that of said separating upper edge of the knife.

8 Claims, 2 Drawing Figures

FLOW DIVIDER FOR A POWDERY MATERIAL

The present invention relates to a flow divider for a powdery material, of the type comprising a duct supplied with powdery material, in which the latter can flow by gravity, a knife with an upper separating edge arranged at the outlet of said duct to divide the inflow of powdery material into two outflows whose flow rates are in a predetermined ratio, and two eduction chutes leading from both sides of the base of the knife.

Until now it has been found practically impossible to obtain satisfactory operation of a flow divider of this type, that is to say, to obtain a separation of the inflow of powdery material into two outflows whose flow rates are in a predetermined ratio with sufficient accuracy, notably when the two chutes concerned are designed to supply respectively two enclosures in which different pressures exist or fluctuate in different manner. In fact, in this case, an air draft is generated from the enclosure whose pressure is highest, to the enclosure whose pressure is lowest, passing above the separating edge of the knife. The result is a disturbance by this air draft of the flow of powdery material at the level of the upper edge of the knife and this modifies the distribution of the flow rates on both sides of this knife and consequently in the two chutes. As a result of the deflection due to the air draft, the flow rate of powdery material then increases in the chute which is connected to the enclosure in which the weaker pressure exists and diminishes in the chute which is connected to the enclosure in which the higher pressure occurs. This case where the pressures in the two enclosures are different often occurs in practice, for example when these enclosures are constituted by reactors intended for the adsorption of fluorine diluted in a gas flow, the powdery material then being constituted by alumina powder. Now, in this particular case, as in other similar cases, it is especially important to ensure an inflow of powdery material into each enclosure at a delivery rate determined with very great accuracy.

The object of the present invention is consequently to overcome the drawbacks of flow dividers of the previously described type and, to this end, it provides such a flow divider, characterized in that it comprises at least one straight air passage, lateral with respect to the vertical axis of the knife, between the inlets of the two said chutes, passing through the plane of the knife at an average level notably below that of said separating upper edge.

Due to this feature, it will be understood that the air draft which passes from one enclosure to the other is, in a way, short circuited by said straight air passage between the inlets of the two chutes, so that, notably if this air passage is of sufficient cross-section, it can no longer become disturbing to the distribution of the powdery material on both sides of the knife at the level of the separating upper edge of the latter. Then, even if the pressures in the two enclosures which are supplied by the chutes are different or fluctuate in a different manner, very accurate flow rates of material in the chutes can be obtained.

Preferably, such a flow divider can be further characterized in that it comprises at least two straight air passages, situated on both sides of the vertical axis of the knife.

According to a particularly advantageous and simple embodiment of the invention, such a flow divider may also be characterised in that the lower part of the knife is wider than its upper part and constitutes a partition in the lower part of a closed intermediate chamber in the bottom of which the two said chutes open.

Of course, the choice of the height of this partition must be the result of a compromise: this height must not be too great, in order that the air which passes from one enclosure to the other may find a sufficiently direct passage in said intermediate chamber between the two chutes, so that practically no air flow occurs at the level of the upper edge of the knife, and it must not be too little to avoid the powdery material which is piled up in the bottom of said intermediate chamber, on both sides of the lower part of the knife, from overflowing by passing above this lower part, which would obviously modify the distribution of the flow rates of powdery material in the two chutes.

Preferably, the upper part of the knife is engaged in the lower part of said duct and extends between two opposite walls of the latter.

The upper part of the knife is thus protected from air flows between the two chutes by a sort of screen which is constituted by the lower part of the duct, in which this upper part of the knife is engaged.

For example, on both sides of this upper part, said knife can include two shoulders on which the lower end of said duct is supported.

On the other hand, it may be arranged that the lower part of said intermediate chamber has a hopper shape, so that the height of piling up of powder material in the intermediate chamber on both sides of the lower part of the knife, is thus limited.

Particularly advantageously, it may also be arranged that said duct is supplied with powdery material through an inclined conduit with a quadrangular cross-section whose bottom extends along one of its edges, in a vertical plane parallel to that of the knife.

Due to this feature, too great a width of the sheet of powdery material flowing in said inclined conduit is avoided and likewise the risk, in consequence, of having notably different thicknesses along this width, which enables the accuracy of the repartition of the inflow of powdery material into two outflows to be further improved.

In order to be able to regulate this repartition, that is to say to be able to modify the two flow rates of powdery material in the two chutes with respect to one another, it is arranged in addition for a flow divider according to the invention to include regulating means for the distance between the vertical plane which contains the bottom of said inclined conduit and the vertical plane of the knife.

In a preferred embodiment, it is provided for this purpose that the upper part of the knife be engaged with slight play in the lower part of said duct and that said inclined conduit being fast to the duct, said adjustment means consist of means for the adjustment of the position of said duct with respect to the knife, in a direction perpendicular to the plane of the knife.

Preferably, such a divider can also be characterized in that it comprises a movable support plate for the lower part of said duct, placed on a fixed cover of said intermediate chamber and that said adjustment means consist of adjustment means for the position of the movable support plate with respect to said cover, in a direction perpendicular to the plane of the knife.

The aforesaid adjustment means may comprise for example at least one screw jack arranged to act between said duct and said cover.

It is possible in addition to provide means for locking said movable support plate on said fixed cover.

Figure 2:
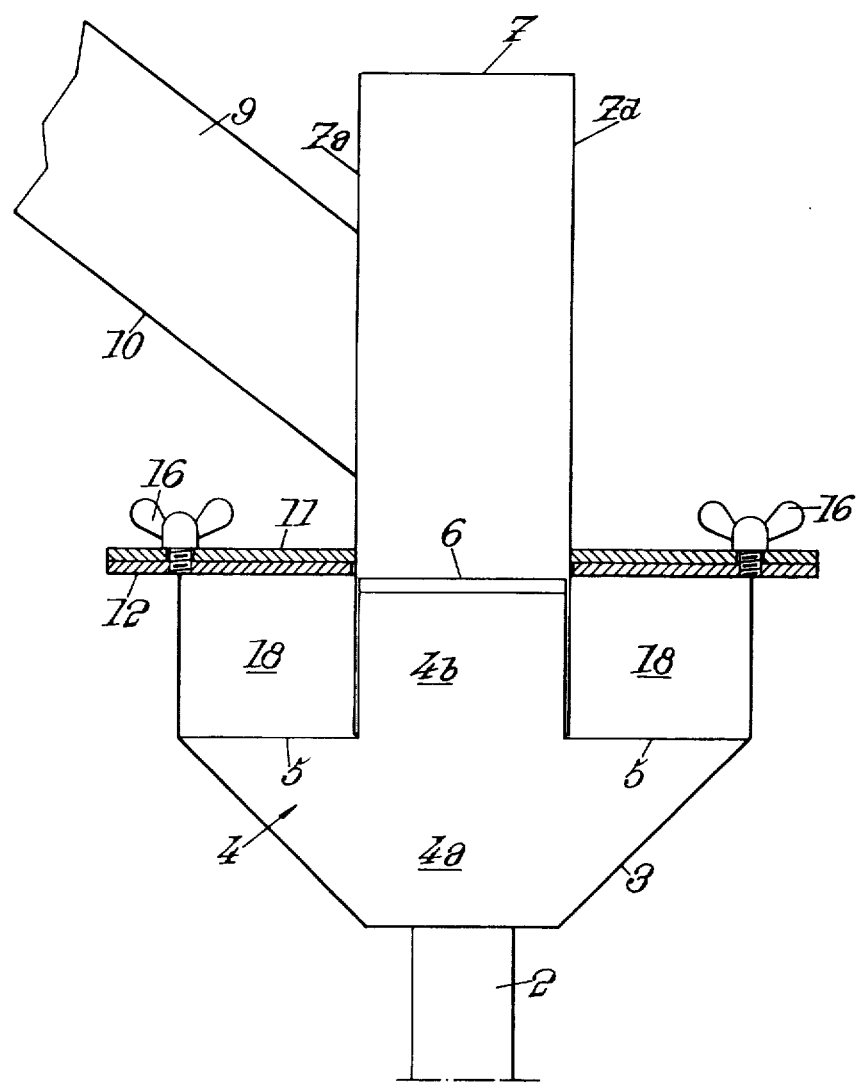

One embodiment of the invention is described below by way of non-limiting example, with reference to the figures of the accompanying drawing in which:

FIG. 1 shows diagrammatically, in perspective, with portions cut away, a flow divider according to the invention; and FIG. 2 is a sectional view along the plane II—II of FIG. 1.

The flow divider shown in the Figures is designed for example to supply powdered alumina to two reactors for the adsorption of dilute fluorine in a gas flow, the static pressures inside these two reactors being different and fluctuating. These two reactors have not been shown in the figures, but they are connected respectively to chutes 1 and 2.

These two chutes open in the bottom of an intermediate chamber 3 on both sides of a vertical partition 4a arranged in the lower part of this chamber and constituting the lower part of a separator knife 4 comprising two lateral shoulders 5 on both sides of a central upper part 4b whose upper edge 6 extends, for example, horizontally and has the shape of an inverted V. The bottom of said intermediate chamber 3 has the shape of a hopper, that is to say the shape of a truncated and inverted quadrangular pyramid. The partition 4a mates the shape of the cross-section of the base of this intermediate chamber perfectly, and it is welded along its bottom and its two opposite side walls, in sealed manner.

The central upper part 4b of the knife 4 is engaged with slight play in the lower part of a vertical duct 7, of which the cross-section is, for example, square and of which the upper end may be closed by a cover 8 serving as an inspection door.

The flow of powdery material, namely alumina, is led into the vertical duct 7 by an inclined conduit 9 opening on a lateral wall 7a of the duct 7, this conduit 9 having a quadrangular cross-section and its bottom 10 extending along one of its edges, in a vertical plane parallel to that of the knife 4, and possibly merging with this plane.

The lower part of the inclined conduit 9 being made fast to said lateral wall 7a of the vertical duct 7, adjustment means are provided for the distance between the vertical plane which contains the bottom 10 of the conduit 9 and the vertical plane which contains the knife 4.

To this end, these adjustment means are arranged to be formed so as to enable the position of duct 7 with respect to the knife to be modified, in a direction perpendicular to the plane of the knife.

To do this, the flow divider includes a movable support plate 11 for the lower part of the duct 7, positioned on a fixed cover 12 closing said intermediate chamber 3 in sealed manner. To enable the position of said movable plate 11 with respect to the cover 12, to be adjusted then, in a direction perpendicular to the plane of the knife, a screw jack 13 is provided, of which one end is supported on a lateral wall 7b of the duct 7 adjacent to that in which the inclined conduit 9 opens, the screw jack being engaged in a nut 14a fixed on a yoke 15a fast to the cover 12.

On the other side of this cover, another yoke 15b is provided, also fast to the cover 12, and bearing a nut 14b so as to enable the screw jack to act on the corresponding lateral wall 7c of the duct 7, to be able to move this duct with respect to the intermediate chamber, in the opposite direction.

Finally, wing nuts 16 are provided, whose base is supported on the edges of an oblong opening 17 of the movable plate 11, and which are engaged in a taping of the cover 12, which permits the position of the movable plate 11 with respect to the cover 12 to be fixed in position after the latter has been adjusted by means of the jack 13.

It should be noted that the base of the vertical duct 7 is partly engaged in the intermediate chamber 3, so as to obtain, between the lower parts of the lateral walls 7a and 7d of the vertical duct 7 and the lateral walls of the intermediate chamber 3 which are respectively opposite these lower parts, two straight air passages 18 between the inlets of the chutes 1 and 2, these passages passing through the geometric plane of the knife 4 at a mean level notably lower than that of the separating upper edge 6 of said knife.

In order that the overall cross-section of these two air passages 18 should be sufficient and enable an air flow above the shoulders 5, between the two reactors, without the possibility of deflection of the stream of powdered material at the level of the edge 6, it is particularly suitable to provide for the width of the upper part 4b of the knife 4 to be equal at most to a third of the width of the knife in its widest part.

In addition, for the same purpose, a considerable engagement of the upper part 4b of the knife 4 in the lower part of the vertical duct 7 is provided, namely, for example, over a height approximately equal to half the overall height of the knife, the height of the lower part 4a of the knife being, moreover, sufficient to avoid any overflow and any risk of the passage of the powdery material from one half to the other of the lower part of the intermediate chamber 3 above the shoulders 5.

The adjustment of the relative flow rates of powdery material in the chutes 1 and 2 is effected as follows: Assuming, for example, that it is desired to increase the flow rate in the chute 1 and reduce it as much in the chute 2, the wing nuts 16 are first unloosened and the movable plate 11 is slid over the fixed cover 12, towards the left (FIG. 1) by operating the screw jack 13. When the new position required is reached, the wing nuts 16 are retightened. If it is desired, on the contrary, to reduce the flow rate in the chute 1, procedure is similar, but by causing the jack 13 to act on the wall 7c of the duct 7, to make the movable plate 11 slide to the right.

As is self-evident, and as emerges already from the foregoing, the invention is in no way limited to those of its types of application, nor to those embodiments of its various parts which have been more especially envisaged, it encompasses on the contrary all modifications.

For example, instead of locating the respective axes of the chutes 1 and 2 in the middle plane perpendicular to the plane of the knife 4, these axes could notably be arranged to be shifted on both sides of this plane, so as to make the corresponding air passages even more direct. To do this, it would suffice to provide a wider knife and to divide the bottom of the hopper 3 into two compartments shifted with respect to the central part of the lower part 4a of the knife 4, which central part would constitute then a partial partition common to these two compartments.

We claim:

1. Flow divider for a powdery material, comprising:
   a. a duct having an inlet and outlet and adapted for gravity flow of material therethrough;

b. a closed chamber communicating with said outlet of the duct;

c. two eduction chutes connected to the bottom of the chamber;

d. knife means mounted in a vertical plane at the outlet of said duct for dividing the material into two outflows, the respective flow rates of which are determined by the position of said knife means, said knife means including an upper part extending between two opposite walls of the duct and a lower part wider than the upper part and forming a partition in said chamber between the two eduction chutes; and e. adjustment means for adjusting the distance between the upper part of the knife means and the other two opposite walls of the duct in a direction perpendicular to the plane of the knife means.

2. Flow divider according to claim 1, in which said knife means comprises two lateral shoulders defining the upper bound of said lower part, and on which the lower end of the duct is supported.

3. Flow divider according to claim 1, in which said duct is supplied with material through an inclined conduit having a quadrangular cross-section and whose bottom extends along one of its edges, in a vertical plane parallel to said upper edge of the knife means, said conduit being connected to one of the walls of the duct above said knife means.

4. Flow divider according to claim 3, comprising a movable plate fixedly secured to and around the lower end of the duct, disposed in slidable contact on a fixed cover of said chamber, said adjustment means being adapted to allow the adjusting of the position of said movable plate with respect to said fixed cover, in a direction perpendicular to the plane of the knife means, said knife means being fixedly secured in the chamber.

5. Flow divider according to claim 4, in which said adjustment means comprises at least one screw jack adapted to act between said duct and said fixed cover.

6. Flow divider according to claim 5, comprising means for locking said movable plate on said fixed cover.

7. Flow divider according to claim 1, in which the intermediate chamber has a hopper shape.

8. Flow divider according to claim 1, in which the upper end of said duct is opened and is provided with a closing cover serving as an inspection door.

* * * * *